US012776195B2

(12) United States Patent
Eckert et al.

(10) Patent No.: US 12,776,195 B2
(45) Date of Patent: Oct. 27, 2026

(54) DISPLAY UNIT FOR AN EVENT INDICATOR SYSTEM

(71) Applicant: Safepro Technologies, Inc., Dousman, WI (US)

(72) Inventors: Paul L. Eckert, Dousman, WI (US); Md. Azizul Islam, Dacca (BD); Md. Rakibul Islam, Dacca (BD); Delwar Hossain, Dacca (BD); Md. Borhan Uddin, Dacca (BD); Christopher B. Hisey, Burlington, WI (US); Md Saifuddin Rakib, Dacca (BD)

(73) Assignee: SAFEPRO TECHNOLOGIES, INC., Dousman, WI (US)

( * ) Notice: Subject to any disclaimer, the term of this patent is extended or adjusted under 35 U.S.C. 154(b) by 66 days.

(21) Appl. No.: 19/088,527

(22) Filed: Mar. 24, 2025

(65) Prior Publication Data

US 2025/0299543 A1 Sep. 25, 2025

Related U.S. Application Data

(60) Provisional application No. 63/569,571, filed on Mar. 25, 2024.

(51) Int. Cl.
*G08B 5/36* (2006.01)
*G08B 7/06* (2006.01)

(52) U.S. Cl.
CPC ............... *G08B 5/36* (2013.01); *G08B 7/062* (2013.01); *G08B 7/066* (2013.01)

(58) Field of Classification Search
CPC .......... G08B 5/36; G08B 7/062; G08B 7/066; F21V 21/00; F21V 21/14
See application file for complete search history.

(56) References Cited

U.S. PATENT DOCUMENTS

| | | | |
|---|---|---|---|
| 3,949,362 | A | 4/1976 | Doyle et al. |
| 4,801,928 | A | 1/1989 | Minter |

(Continued)

FOREIGN PATENT DOCUMENTS

| | | | |
|---|---|---|---|
| CN | 201399164 | Y | 2/2010 |
| CN | 201791279 | U | 4/2011 |

(Continued)

OTHER PUBLICATIONS

Rondeau, "Adaptive RF Technology," DARPA, Defense Advanced Research Projects Agency, <https://www.darpa.mil/program/adaptive-rf-technologies> webpage available as early as Jul. 3, 2015.

(Continued)

*Primary Examiner* — Hoi C Lau
(74) *Attorney, Agent, or Firm* — MICHAEL BEST & FRIEDRICH LLP

(57) ABSTRACT

A display unit for an event indicator system configured to assist occupants of a venue in response to an evacuation situation includes a housing configured to be mountable to a ceiling, the housing including a first housing portion and a second housing portion coupled to and rotatable relative to the first housing portion. A plurality of light emitting elements are affixed within the second housing portion such that the plurality of light emitting elements are rotatable with the second housing portion relative to the first housing portion such that a propagation direction of light from the plurality of light emitting elements is adjustable relative to the ceiling. A processing system is positioned within the housing and configured to communicate with the sensor to receive the signal from the sensor and control at least one of the plurality of light emitting elements in response to the signal.

20 Claims, 6 Drawing Sheets

(56) References Cited

U.S. PATENT DOCUMENTS

| | | | | | |
|---|---|---|---|---|---|
| 5,014,167 | A | | 5/1991 | Roberts | |
| 5,140,301 | A | | 8/1992 | Watanabe | |
| 5,355,284 | A | | 10/1994 | Roberts | |
| 5,923,243 | A | | 7/1999 | Bleiner | |
| 6,005,724 | A | | 12/1999 | Yamato et al. | |
| 6,142,649 | A | | 11/2000 | Beghelli | |
| 6,150,943 | A | * | 11/2000 | Lehman | G08B 7/062 340/332 |
| 6,369,899 | B1 | | 4/2002 | Hamada | |
| 6,402,352 | B1 | * | 6/2002 | Summerford | F21S 8/088 362/426 |
| 6,422,728 | B1 | | 7/2002 | Riggin | |
| 6,460,999 | B1 | | 10/2002 | Suzuki | |
| 6,606,808 | B2 | * | 8/2003 | Katz | G09F 13/04 40/564 |
| 6,646,545 | B2 | | 11/2003 | Bligh | |
| 6,685,347 | B2 | | 2/2004 | Grutze | |
| 6,733,134 | B2 | | 5/2004 | Bleiner | |
| 7,109,880 | B2 | * | 9/2006 | Sibalich | F21S 8/02 340/693.9 |
| 7,192,172 | B1 | | 3/2007 | Alberti | |
| 7,460,020 | B2 | | 12/2008 | Reyes et al. | |
| 7,663,502 | B2 | * | 2/2010 | Breed | B60C 11/24 340/7.29 |
| 8,319,367 | B2 | * | 11/2012 | Liao | A62C 35/605 290/43 |
| 8,917,024 | B2 | * | 12/2014 | Sloan | G01J 1/02 250/214 AL |
| 9,286,790 | B2 | * | 3/2016 | Lyman | G08B 17/02 |
| 10,679,480 | B2 | * | 6/2020 | Eckert | G08B 5/36 |
| 11,393,305 | B2 | * | 7/2022 | Wedig | G08B 7/066 |
| 11,508,223 | B2 | * | 11/2022 | Kronz | G08B 7/066 |
| 11,573,005 | B1 | * | 2/2023 | Spiro | F21V 23/003 |
| 12,236,775 | B2 | * | 2/2025 | Lewis | G09F 19/18 |
| 12,313,241 | B2 | * | 5/2025 | Spiro | F21S 8/043 |
| 12,651,517 | B2 | * | 6/2026 | Wolf | G08B 7/066 |
| 2002/0003470 | A1 | | 1/2002 | Auerbach | |
| 2002/0057204 | A1 | | 5/2002 | Bligh | |
| 2005/0046584 | A1 | * | 3/2005 | Breed | B60C 11/24 340/13.31 |
| 2006/0071802 | A1 | | 4/2006 | Right et al. | |
| 2006/0077069 | A1 | * | 4/2006 | Kontovich | G08B 7/066 340/815.87 |
| 2007/0069882 | A1 | | 3/2007 | Mahajan | |
| 2007/0273550 | A1 | | 11/2007 | Price et al. | |
| 2008/0099662 | A1 | | 5/2008 | Musiel et al. | |
| 2008/0266065 | A1 | | 10/2008 | Kennedy | |
| 2010/0023252 | A1 | | 1/2010 | Mays et al. | |
| 2011/0267179 | A1 | | 11/2011 | Patterson | |
| 2012/0038479 | A1 | | 2/2012 | Ten Wolde | |
| 2012/0063270 | A1 | | 3/2012 | Angell | |
| 2012/0092183 | A1 | * | 4/2012 | Corbett | F21S 2/005 340/815.4 |
| 2014/0313727 | A1 | * | 10/2014 | Dupre | F21S 8/036 362/368 |
| 2014/0340222 | A1 | | 11/2014 | Thornton et al. | |
| 2015/0124087 | A1 | | 5/2015 | Jones et al. | |
| 2015/0204109 | A1 | | 7/2015 | Ergenbright | |
| 2016/0247369 | A1 | | 8/2016 | Simmons | |
| 2025/0299543 | A1 | * | 9/2025 | Eckert | G08B 7/066 |

FOREIGN PATENT DOCUMENTS

| | | | |
|---|---|---|---|
| CN | 113034935 | A | 6/2021 |
| CN | 113375088 | A | 9/2021 |
| DE | 19823691 | A1 | 12/1999 |
| IT | 202100015617 | A1 | 12/2022 |

OTHER PUBLICATIONS

International Search Report and Written Opinion for Application No. PCT/US2019/022708 dated Jun. 25, 2019 (17 pages).

* cited by examiner

DISPLAY UNIT FOR AN EVENT INDICATOR SYSTEM

CROSS-REFERENCE TO RELATED APPLICATIONS

This application claims priority to U.S. Provisional Application No. 63/569,571, the entire contents of which are incorporated herein by reference.

FIELD OF INVENTION

The present disclosure relates to event indicator systems for assisting occupants in a venue, for example, in an evacuation situation, such as an active shooter situation.

BACKGROUND

U.S. Pat. No. 10,679,480 discloses an event indicator system that will detect the location of a dangerous event (such as the presence of smoke, fire, gunshot or the like) and will respond by performing several actions to shorten emergency response time and aid in separating potential victims from a nearby threat thereby reducing the number of human casualties. Some disclosed functions of the event indicator system include the following basic functions: (1); detect an event; (2) determine the event threat type and severity level; (3) notify emergency responders; (4) communicate location of the threat and direction to safety; and (5) collect and compile event data.

In one example, the '480 Patent discloses an event indicator system configured to assist occupants of a building in response to an active shooter situation. The event indicator system includes a plurality of sensor units configured to be arranged in the building to detect a gunshot and generate a signal indicative of the gunshot within the building. The event indicator system includes a processing system (i.e., control center) in communication with the plurality of sensors to receive the signal. The processing system is configured to determine an approximate location of the gunshot based on the signal and determine safe areas and unsafe areas in the building based on the approximate location of the gunshot. The event indicator system also includes a plurality of output devices in communication with the processing system configured to be arranged in the building. The output devices are configured to indicate an evacuation path within the safe areas with a first graphic (e.g., a green arrow) and indicate the unsafe areas with a second graphic (e.g., a red "X") that is different from the first graphic. The event indicator system also includes an indicator configured to be arranged in a room of the building and configured to generate a lock down indication to notify occupants to stay in the room in response to the processing system receiving the signal.

The '480 Patent further discloses that the output device includes light emitting components capable of producing projected images onto surrounding surfaces such as the floor and walls of a building interior. The light could be generated by lasers or other light emitting technologies. The output device is mounted on a ceiling and projects light onto a second surface, such as a wall, that is different than the ceiling. The output device leverages data from the main processing system to activate one or more of the output devices to produce a specific visual communication graphic, pattern or other visual effect using light (hereafter called, "graphic") which are related to the location of the threat detected. The intent of the graphic is to communicate important information to all participants of an event (building occupants, general public, emergency responders) to influence behavior of all participants toward actions resulting in eliminating or reducing the number of casualties.

The '480 Patent discloses that the graphic style will vary depending on the event type and severity level. Examples of graphics are, artwork such as arrows, X's, other directional symbols, text descriptions, animated movement, colors, or any other visual effect best suited to communicate a particular message in a given situation or venue.

In some embodiments, to manage a scenario involving an active shooter, the output device of the '480 Patent indicates safe areas with the first graphic such as green arrows and indicates unsafe areas with the second graphic, such as red X's. Green arrows indicate a direction of safe travel away from the shooter and red "X's" indicate the location of the shooter or unsafe locations within line-of-sight of the shooter.

SUMMARY

In some aspects, the techniques described herein relate to a display unit for an event indicator system configured to assist occupants of a venue in response to an evacuation situation sensed by a sensor configured to generate a signal in response to detection of the evacuation situation, the display unit including: a housing configured to be mountable to a ceiling of the venue via a bracket, the housing including a first housing portion coupled to the bracket and a second housing portion coupled to and rotatable relative to the first housing portion; a plurality of light emitting elements affixed within the second housing portion such that the plurality of light emitting elements are rotatable with the second housing portion relative to the first housing portion such that a propagation direction of light from the plurality of light emitting elements is adjustable relative to the ceiling; and a processing system positioned within the housing and configured to communicate with the sensor to receive the signal from the sensor and control at least one of the plurality of light emitting elements in response to the signal.

In some aspects, the techniques described herein relate to a display unit, wherein the propagation direction of light from the plurality of light emitting elements is directed to a wall extending downward from the ceiling.

In some aspects, the techniques described herein relate to a display unit, wherein the second housing portion is substantially cylindrical defining a central axis, wherein the central axis is a rotational axis of the second housing portion relative to the first housing portion.

In some aspects, the techniques described herein relate to a display unit, wherein the plurality of light emitting elements is a first plurality of light emitting elements, the display unit further including: a third housing portion coupled to and rotatable relative to the first housing portion, and a second plurality of light emitting elements affixed within the third housing portion such that the second plurality of light emitting elements are rotatable with the third housing portion relative to the first housing portion.

In some aspects, the techniques described herein relate to a display unit, wherein the third housing portion is separate and distinct from the second housing portion such that the third housing portion is rotatable without rotation of the second housing portion and the second housing portion is rotatable without rotation of the third housing portion.

In some aspects, the techniques described herein relate to a display unit, wherein the propagation direction of light from the first plurality of light emitting elements is directed to a first wall extending downward from the ceiling, and wherein a propagation direction of light from the second plurality of light emitting elements is directed to a second wall extending downward from the ceiling, the second wall opposite the first wall.

In some aspects, the techniques described herein relate to a display unit, further including a third plurality of light emitting elements affixed within the first housing portion such that a propagation direction of light from the third plurality of light emitting elements is towards a floor surface.

In some aspects, the techniques described herein relate to a display unit, wherein the second housing portion is rotatable relative to the first housing portion about a first rotational axis, and wherein the third housing portion is rotatable relative to the first housing portion about a second rotational axis, wherein the first rotational axis is parallel to the second rotational axis.

In some aspects, the techniques described herein relate to a display unit, wherein the first housing portion includes an upper housing coupled to the bracket and a lower housing coupled to the upper housing, wherein the second housing portion is at least partially encapsulated between the upper housing and the lower housing.

In some aspects, the techniques described herein relate to a display unit, wherein the sensor is positioned within the housing.

In some aspects, the techniques described herein relate to a display unit, wherein the plurality of light emitting elements includes a first light emitting element configured to project an arrow and a second light emitting element configured to project an X.

In some aspects, the techniques described herein relate to a display unit, wherein the processing system is positioned within the first housing portion.

In some aspects, the techniques described herein relate to a display unit, wherein the second housing portion is rotatable relative to the first housing portion between an uppermost position and a lowermost position and is holdable at a plurality of positions between the uppermost position and the lowermost position.

In some aspects, the techniques described herein relate to a display unit, wherein the first housing portion includes an upper side coupled to the bracket and an underside opposite the upper side, wherein a protrusion extends outward away from an interior of the housing to support a plurality of stationary light emitting elements therein, wherein the plurality of stationary light emitting elements are configured to project light on a floor surface.

In some aspects, the techniques described herein relate to a display unit for an event indicator system configured to assist occupants of a venue in response to an evacuation situation detected by a sensor configured to generate a signal in response to an input, the display unit including: a housing configured to be mountable to a ceiling of the venue via a bracket, the housing including a first housing portion coupled to the bracket a second housing portion coupled to and rotatable relative to the first housing portion, and a third housing portion coupled to and rotatable relative to the first housing portion, the second and third housing portions separate and distinct from one another; a first plurality of light emitting elements affixed within the second housing portion such that the first plurality of light emitting elements are rotatable with the second housing portion relative to the first housing portion such that a propagation direction of light from the first plurality of light emitting elements is adjustable relative to the ceiling; a second plurality of light emitting elements affixed within the third housing portion such that the second plurality of light emitting elements are rotatable with the third housing portion relative to the first housing portion such that a propagation direction of light from the second plurality of light emitting elements is adjustable relative to the ceiling; and a processing system positioned within the housing and in communication with the sensor and configured to receive the signal from the sensor and control at least one of the first plurality of light emitting elements and at least one of the second plurality of light emitting elements in response to the signal.

In some aspects, the techniques described herein relate to a display unit, wherein the at least one of the first plurality of light emitting elements and the at least one of the second plurality of light emitting elements is configured to direct occupants in a desired direction within the evacuation situation.

In some aspects, the techniques described herein relate to a display unit, further including a third plurality of light emitting elements coupled to the first housing portion and non-rotatable relative to the first housing portion, wherein the third plurality of light emitting elements is configured to direct occupants in a desired direction within the evacuation situation.

In some aspects, the techniques described herein relate to a display unit, wherein the first plurality of light emitting elements is configured to project light on a first wall extending from the ceiling, the second plurality of light emitting elements is configured to project light on a second wall extending from the ceiling, and the third plurality of light emitting elements is configured to project light on a floor surface.

In some aspects, the techniques described herein relate to a display unit, wherein the second housing portion is substantially cylindrical, defining a central axis, wherein the central axis of the second housing portion is a rotational axis of the second housing portion relative to the first housing portion, wherein the third housing portion is substantially cylindrical, defining a central axis, wherein the central axis of the third housing portion is a rotational axis of the third housing portion relative to the first housing portion, and wherein the central axis of the second housing portion is parallel to the central axis of the third housing portion.

In some aspects, the techniques described herein relate to a display unit for an event indicator system configured to assist occupants of a venue in response to an evacuation situation, the display unit including: a housing configured to be mountable to a ceiling of the venue via a bracket, the housing including a first housing portion coupled to the bracket a second housing portion coupled to and rotatable relative to the first housing portion, and a third housing portion coupled to and rotatable relative to the first housing portion, the second and third housing portions separate and distinct from one another; a first plurality of light emitting elements affixed within the second housing portion such that the first plurality of light emitting elements are rotatable with the second housing portion relative to the first housing portion such that a propagation direction of light from the first plurality of light emitting elements is adjustable relative to the ceiling; a second plurality of light emitting elements affixed within the third housing portion such that the second plurality of light emitting elements are rotatable with the third housing portion relative to the first housing portion such that a propagation direction of light from the second plurality of light emitting elements is adjustable relative to the ceiling; and a processing system positioned within the housing and configured to control at least one of the first plurality of light emitting elements and at least one of the second plurality of light emitting elements, wherein the at least one of the first plurality of light emitting elements and the at least one of the second plurality of light emitting elements is configured to generate a symbol on a respective wall to direct occupants in a desired direction within the evacuation situation.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

FIGS. 1-6 illustrate a display unit 100 for an event indicator system that identifies an emergency situation or evacuation situation at a venue and provides instructions to assist occupants of the venue to lead the occupants to safety. In some embodiments, the venue may be a school, a place of business, or a place of assembly such as an assembly hall, music venue, or sports venue. The display unit 100 is mountable to a ceiling 200 (FIG. 6) and may be placed within a hallway or other passageway that allows for multiple directions of travel. The emergency situation identified by the display unit 100 may be an active shooter situation, a fire, or other situation that occupants of the venue would be inclined to avoid. In some embodiments, the entirety of the event indicator system is housed within the display unit 100. In other embodiments, some components, such as the sensor 152 that identifies (i.e., senses) the emergency situation, may be located separate from the display unit 100, connected to the display unit via a wired or wireless connection.

Figure 1:
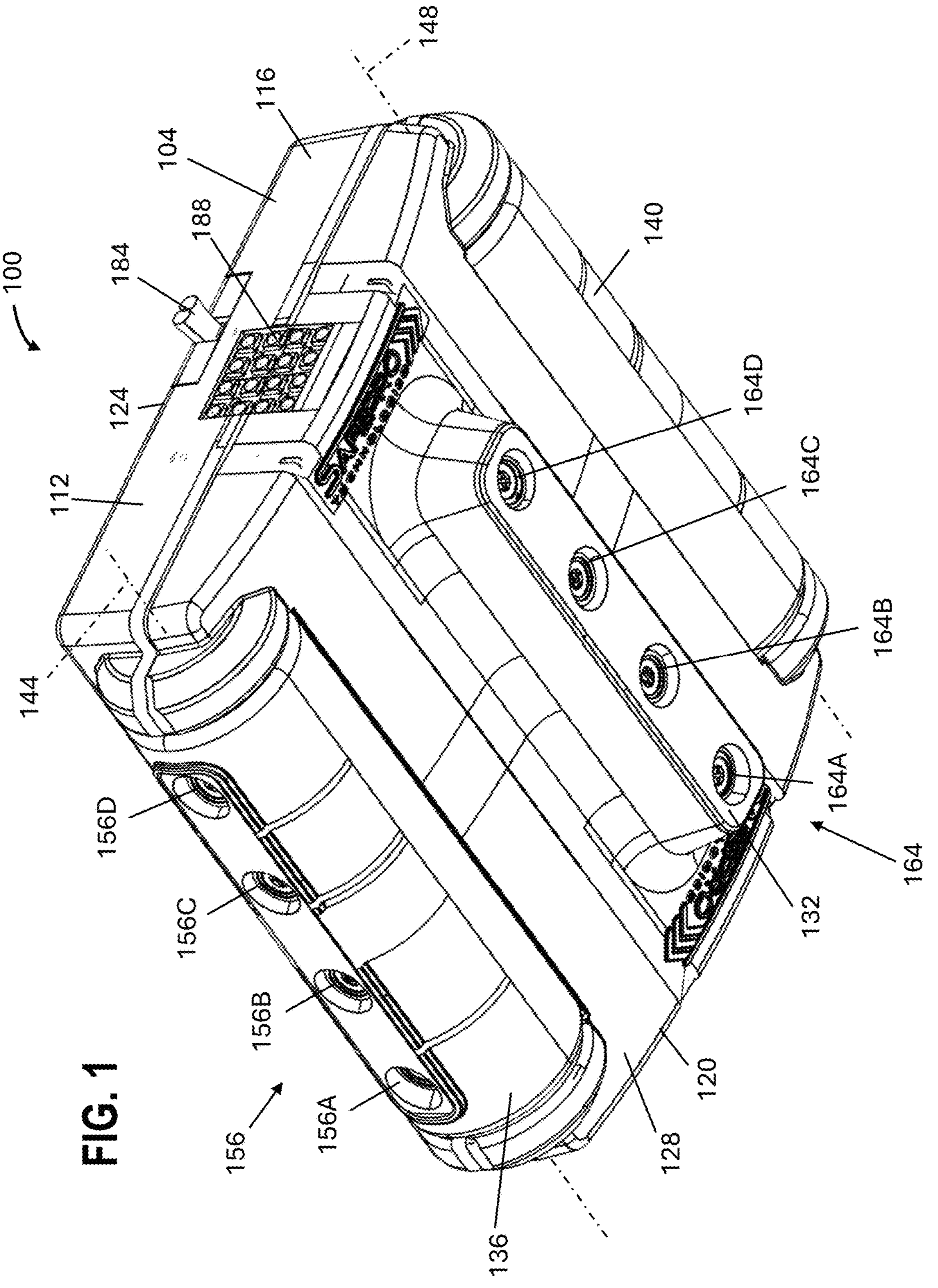
FIG. 1 illustrates a lower perspective view of a display unit for an event indicator system.
Figure 2:
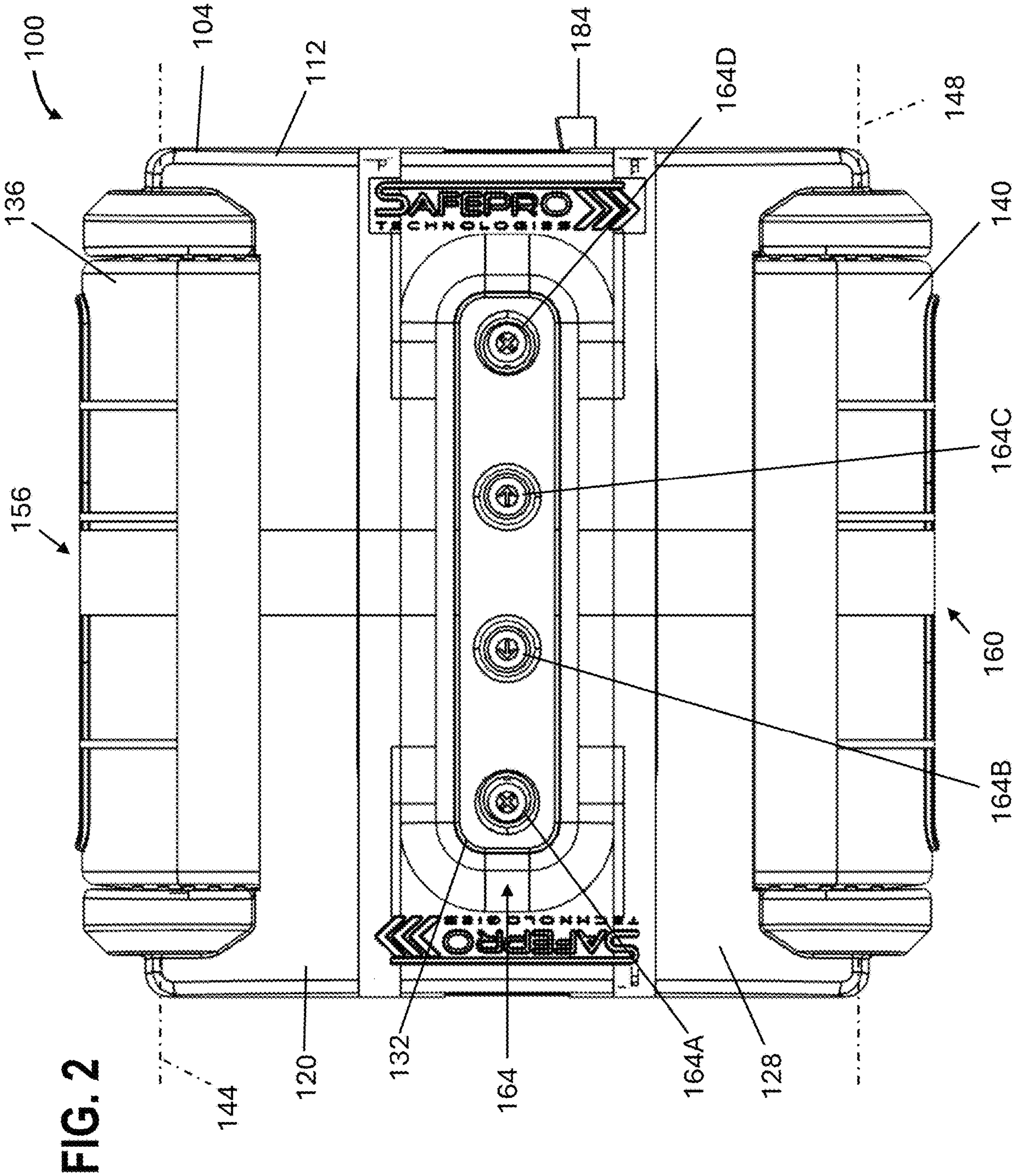
FIG. 2 illustrates a lower view of the display unit of FIG. 1.
Figure 3:
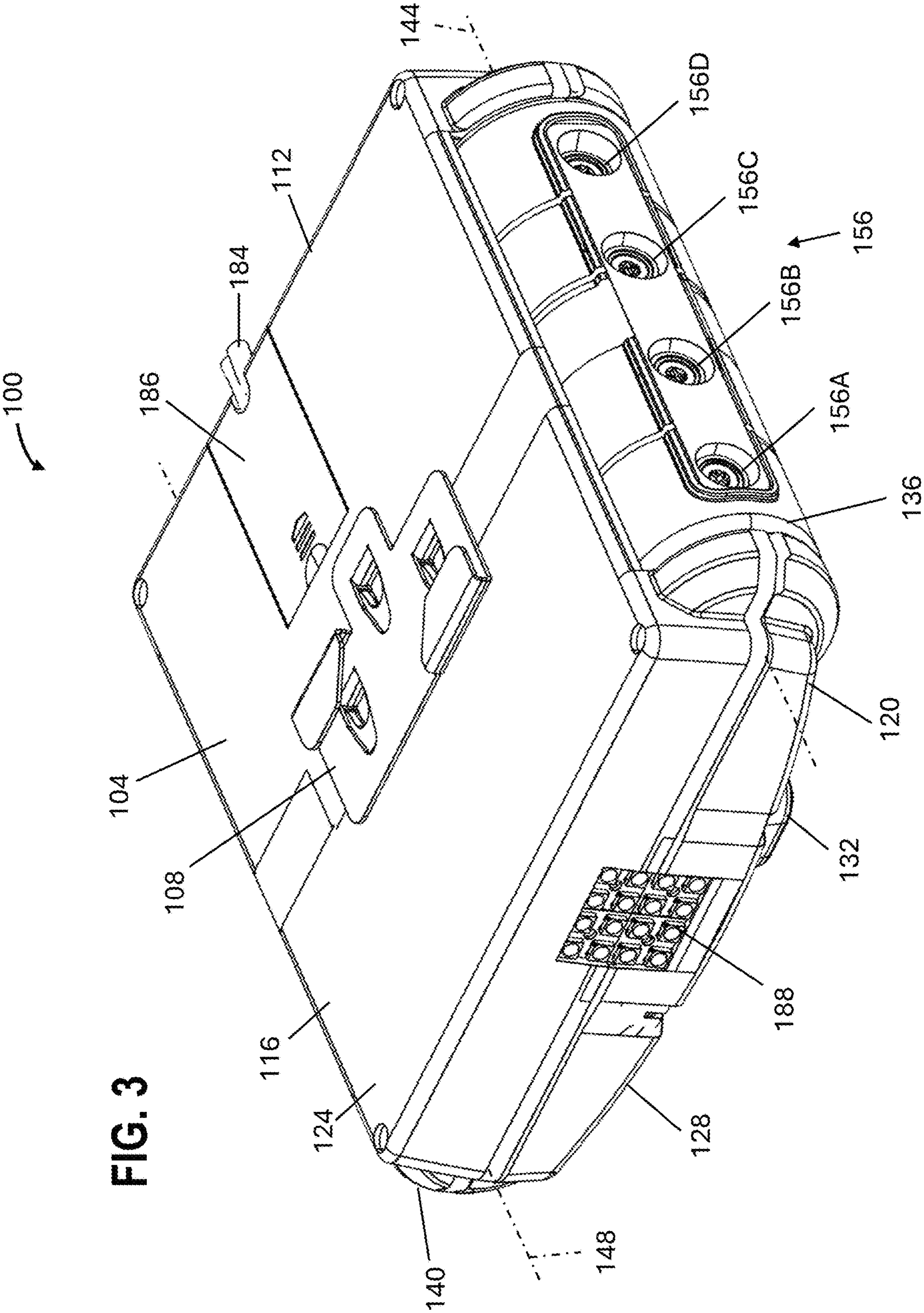
FIG. 3 illustrates an upper perspective view of the display unit of FIG. 1.

FIG. 1 illustrates a housing 104 that forms the body of the display unit 100. The housing 104 includes a first housing portion 112, a second housing portion 136, and a third housing portion 140. The first housing portion 112 is generally rectangular and includes an upper housing 116 and a lower housing 120. The upper housing 116 and the lower housing 120 are separable from one another to provide access to the internal space within the first housing portion 112. The first housing portion 112 extends between an upper side 124 (formed by the upper housing 116) and an underside 128 (formed by the lower housing 120). As the display unit 100 is mounted to a ceiling 200 (FIG. 6), the underside 128 of the first housing portion 112 is generally visible when the display unit 100 is mounted, whereas the upper side 124 is generally not visible without removing the display unit 100 from the ceiling 200. FIG. 3 illustrates a bracket 108 (e.g., a sheet metal bracket) for mounting the first housing portion 112 to the ceiling 200. As shown, the bracket 108 is coupled to the upper side 124 of the first housing portion 112 via tabs extending into the first housing portion 112. In other embodiments, the bracket 108 may be fastened to the first housing portion 112 via fasteners (e.g., threaded fasteners) or may be otherwise integrally formed with the first housing portion 112. The bracket 108 is formed as a pair of opposing clips that engage the ceiling (e.g., engage a ceiling tile grid/frame of a drop ceiling). By positioning the bracket 108 adjacent the ceiling in a rotated orientation (relative to the final mounting orientation), the bracket 108 can slide around and grasp the ceiling tile grid/frame by rotating the bracket 108 (and the remainder of the display unit 100 mounted thereto) relative to the ceiling 200. In this way, the display unit is mountable to the ceiling 200. In some embodiments, the bracket 108 may allow for adjustment of the placement of the display unit 100 relative to the ceiling 200 by permitting sliding repositioning of the bracket 108 along the ceiling tile grid/frame. While the term "ceiling" is described in reference to a standard ceiling of a business, arena, or school, use of the display unit 100 within a venue having high ceilings (such as a manufacturing plant or arena), the "ceiling" may otherwise be a construction beam support or another horizontal mounting plane (e.g., a horizontal shelf or brace extending outward from a wall). Additionally, while the display unit is described in a normal use case mounted to a ceiling 200, certain situations (e.g., when it is desirable to project onto the ceiling 200) may instead mount the display unit 100 to a wall.

With continued reference to FIG. 1, the underside 128 of the first housing portion 112 includes a protrusion 132. The protrusion 132 is centered on the underside 128 of the first housing portion 112 (and centered on the whole housing 104) and is generally racetrack shaped (e.g., rectangular with semicircular ends), extending downward from the underside 128 (i.e., away from the ceiling 200 when mounted) and outward away from tan interior of the housing 104. The protrusion 132 supports a set of light emitting elements 164 (e.g., light emitting diodes, also known as LEDs) therein, for emitting light towards a floor surface 212 (opposite the ceiling 200 to which the display unit 100 is mounted). As shown in greater detail in FIG. 2, the light emitting elements 164 includes four light emitting elements 164A, 164B, 164C, 164D. A first light emitting element 164A for emitting an "X" (e.g., a red X) or other indication for an occupant to stop (e.g., a stop sign) or turn around. A second light emitting element 164B emits an arrow (e.g., a green arrow) pointing in a first direction (e.g., one of the directions of the hallway) to indicate that the occupant should travel in the first direction. A third light emitting element 164C emits an arrow (e.g., a green arrow) pointing in a second direction (e.g., the other direction of the hallway), which may be opposite the first direction, to indicate that the occupant should travel in the second direction. A fourth light emitting element 164D is similar to the first light emitting element 164A, emitting an indication to stop or turn around. In some embodiments, more or fewer light emitting elements 164 may direct images or symbols to the floor 212. For example, in some embodiments, the fourth light emitting element 164D may be omitted. In still other embodiments, if more than two directions of travel are possible (e.g., at the intersection of two hallways), more arrows may be utilized.

Figure 4:
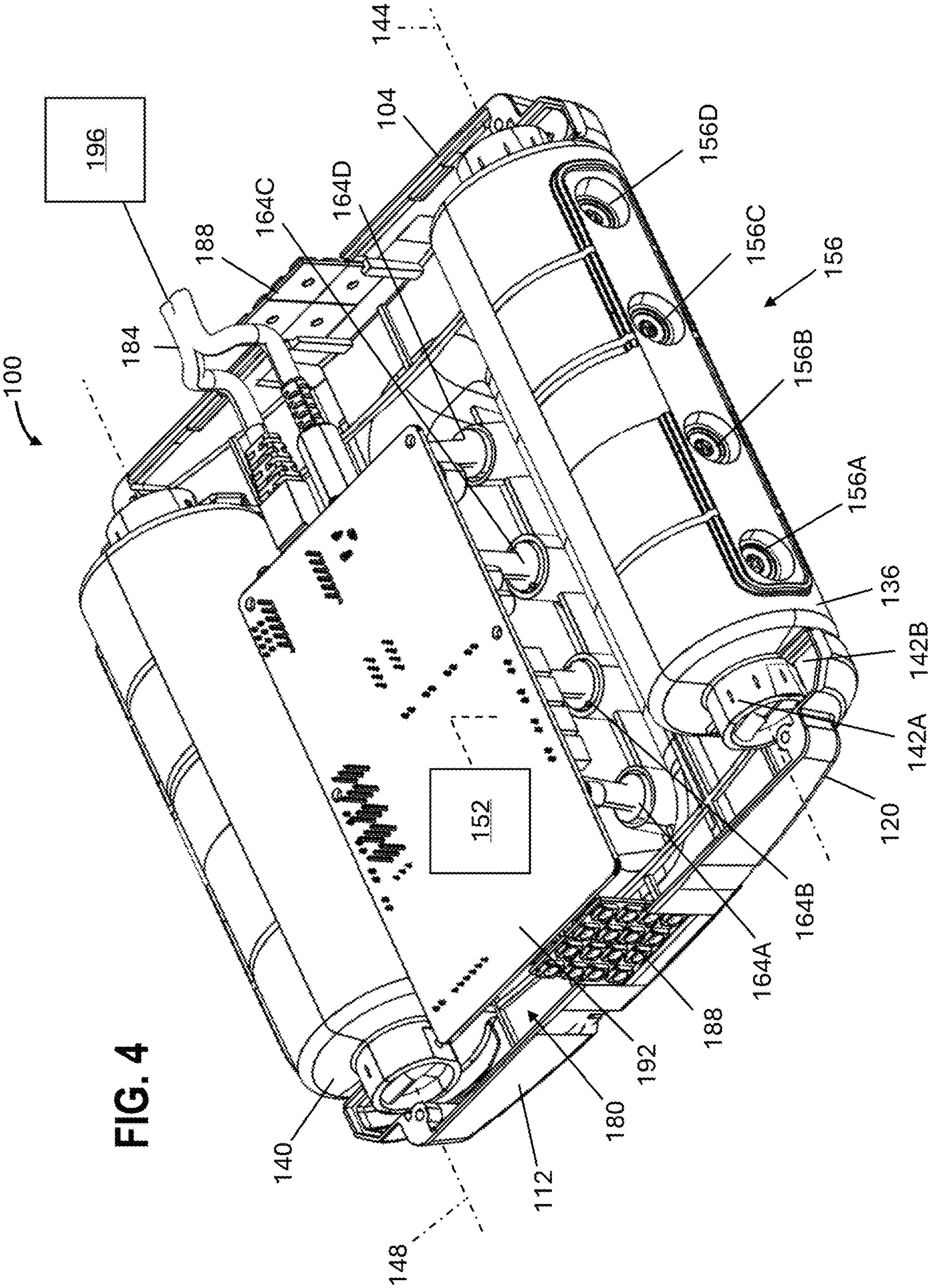
FIG. 4 illustrates the display unit of FIG. 1 with an upper housing removed to illustrate the internals of the display unit.
Figure 5:
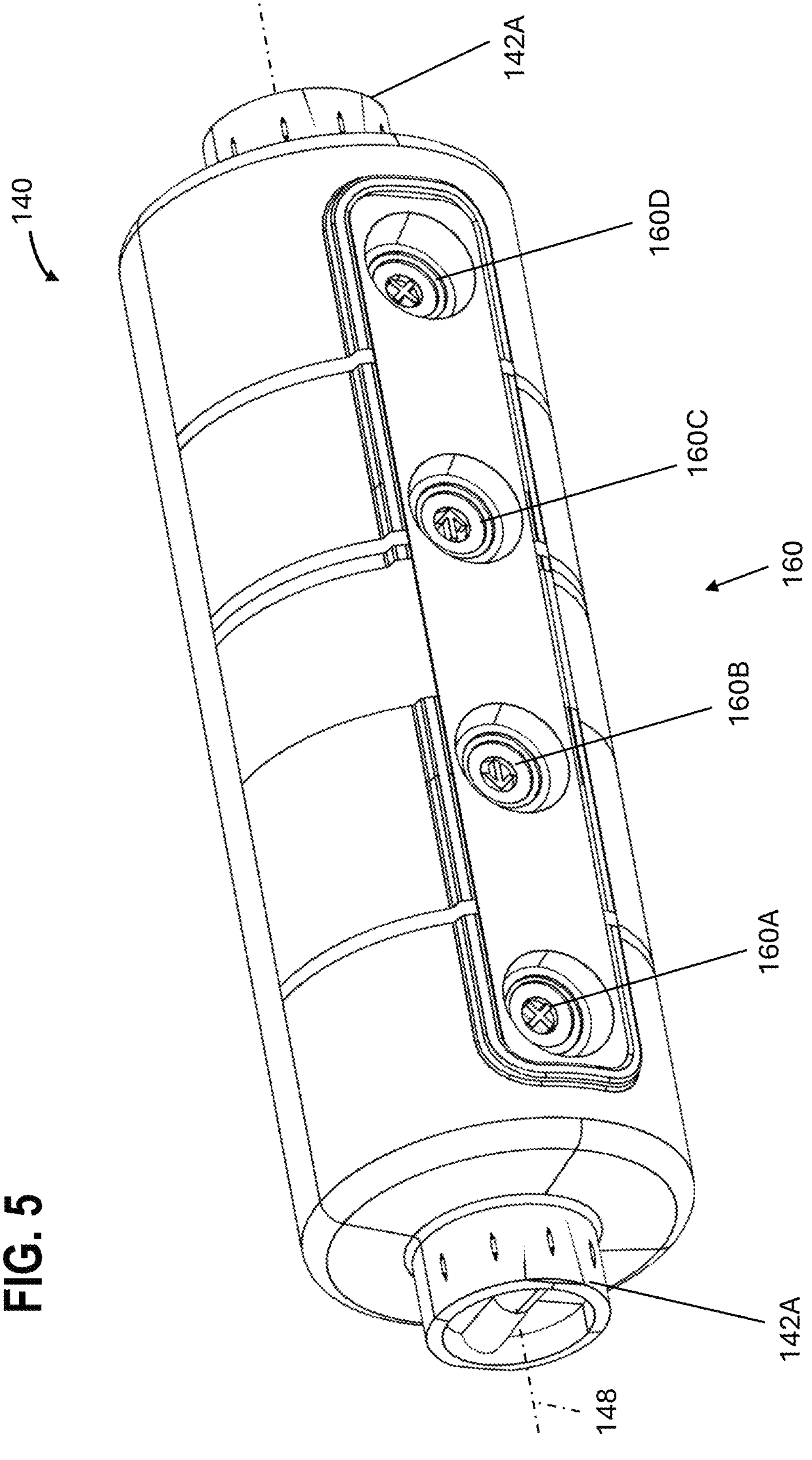
FIG. 5 illustrates a third housing portion of the display unit of FIG. 1.

The second and third housing portions 136, 140 are coupled to the first housing portion 112 and are rotatable relative to the first housing portion 112. In some embodiments, the second and third housing portions 136, 140 are roller drums. The second and third housing portions 136, 140 are also rotatable relative to one another. The second housing portion 136 is rotatable without rotating the third housing portion 140 and the third housing portion 140 is likewise rotatable without rotation of the second housing portion 136. The second and third housing portions 136, 140 are located on opposite sides of the first housing portion 112 and are at least partially disposed within the interior volume of the first housing portion 112, at least partially encapsulated between the upper housing 116 and the lower housing 120. The second and third housing portions 136, 140 are substantially identical to one another. FIGS. 1 and 4 illustrate the second housing portion 136 in greater detail and FIG. 5 illustrates the third housing portion 140 in greater detail. Description of the third housing portion 140 is provided below, with the description applying equally to the third housing portion 140, except as otherwise described.

The second housing portion 136 is generally cylindrical, having a substantially cylindrical outer surface that extends between two longitudinal ends. The two ends are generally circular. A rotational axis 144 (e.g., a central axis) of the second housing portion 136 is defined by the substantially cylindrical body. The second housing portion 136 is rotatable about the rotational axis within a predetermined range. A set of light emitting elements 156 is positioned within (and affixed within) the second housing portion 136 and is rotatable with the second housing portion 136, relative to the first housing portion 112, about the rotational axis 144. The set of light emitting elements 156 is positioned and configured to emit light away from the second housing portion 136 and to a wall 204, such as a wall extending downward from the ceiling 200. Rotation of the second housing portion 136 relative to the first housing portion 112 (which is fixed relative to the ceiling 200) therefore modifies the propagation direction 168 of the light from the set of light emitting elements 156. As shown in FIG. 4, the longitudinal ends of the second housing portion 136 include cylindrical posts 142A that rest within cradles 142B formed by the first housing portion 112 (e.g., a lower cradle formed by the lower housing 120 and an upper cradle formed by the upper housing 116 that collectively encapsulate the post 142A). The posts 142A are rotatable within and along the cradles 142B to provide the relative rotation between the two housing portions 112, 136. In some embodiments a holding mechanism such as a friction hinge, detents or grooves, or a non-circular outer profile of the posts 142A allow the second housing portion 136 to hold in various rotational positions within the prescribed range of motion, such that the second housing portion 136 can be set in a desired position and retain that position. Depending on the style of holding mechanism, the second housing portion 136 may be holdable at distinct intervals (e.g., every 5 degrees, every 10 degrees, every 15 degrees) or may be otherwise infinitely adjustable within the available range (e.g., 145 degrees). In some embodiments, a lock (e.g., a physical blocking member) may prevent accidental or intentional rotational displacement from the desired position without first disengaging the lock.

As discussed above, the third housing portion 140 is identical to the second housing portion 136, though is spaced apart and separate from the second housing portion 136, such that the third housing portion 140 is rotatable about a separate rotational axis 148 (e.g., central axis), spaced apart from and parallel to the rotational axis 144 of the second housing portion 136. Each of the first and second rotational axes 144, 148 are equidistant from the ceiling 200 when the display unit 100 is mounted to the ceiling 200. Additionally, the third housing portion 140 has its own set of light emitting elements 160, each of which is positioned and configured to emit light away from the third housing portion 140 and to a second wall 208, opposite the first wall 204. Similar to the first wall 204, the second wall 208 may be a wall that extends downward from the ceiling 200.

The set of light emitting elements 156 of the second housing portion 136 (hereinafter referred to as the first set of light emitting elements 156) includes four light emitting elements 156A, 156B, 156C, 156D (e.g., LEDs). Similarly, the set of light emitting elements 160 of the third housing portion 140 (hereinafter referred to as the second set of light emitting elements 160) includes four light emitting elements 160A<160B, 160C, 160D. In some embodiments, such as is shown, the first light emitting elements 156A, 156B, 156C, 156D are identical in type (e.g., symbol, color) and arrangement (e.g., order) to the second light emitting elements 160A, 160B, 160C, 160D. In some embodiments, such as is shown, each of these are also identical to the light emitting elements 164A, 164B, 164C, 164D of the first housing portion 112 (hereinafter referred to as the third set of light emitting elements 164). As such, each of the first and second housings 136, 140 includes a first light emitting element 156A, 160A for emitting an "X" (e.g., a red X) or other indication for an occupant to stop (e.g., a stop sign) or turn around, a second light emitting element 156B, 160B emitting an arrow (e.g., a green arrow) pointing in a first direction (e.g., one of the directions of the hallway) to indicate that the occupant should travel in the first direction, a third light emitting element 156C, 160C emitting an arrow (e.g., a green arrow) pointing in a second direction (e.g., the other direction of the hallway), which may be opposite the first direction, to indicate that the occupant should travel in the second direction, and a fourth light emitting element 156D, 160D similar to the first light emitting element 156A, 160A, emitting an indication to stop or turn around. In some embodiments, the second and third light emitting elements 156B, 160B, 156C, 160C are identical to one another, though mounted within the respective housing portions 136, 140 rotated relative to one another. In some embodiments, each of the four light emitting elements of the respective set 156, 160, 164 direct light parallel to one another. In other embodiments, the individual diodes (for example, elements 156A, 156B, 156C, 156D) may be positioned at angles (e.g., 15 degrees) relative to one another.

Figure 6:
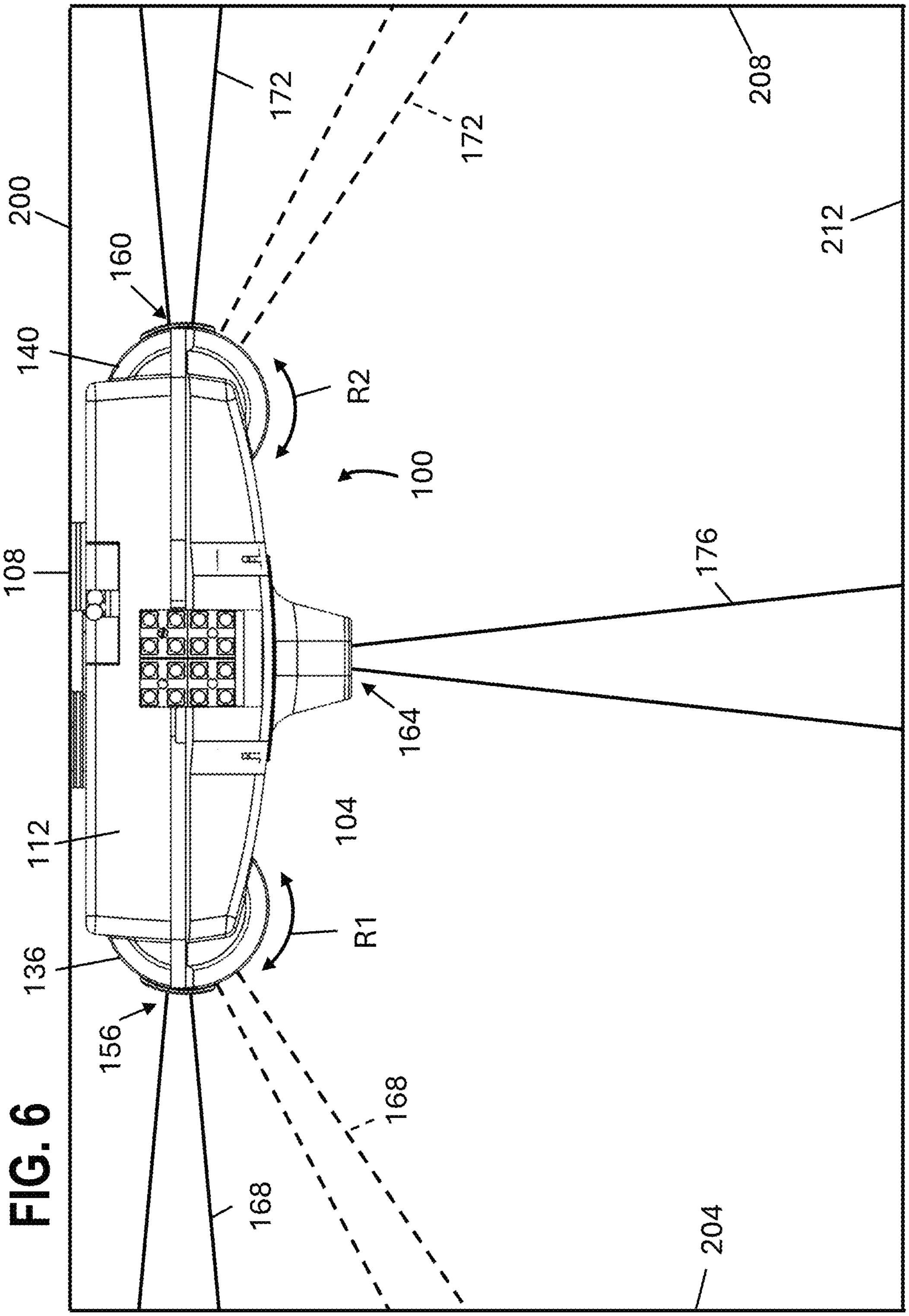
FIG. 6 illustrates the display unit of claim 1 within an environment including a ceiling, a pair of opposite walls, and a floor.

As shown in FIG. 6, each of the first and second sets of light emitting elements 156, 160 is rotatable relative to the first housing portion 112 with the respective second and third housings 136, 140. The second housing portion 136 is rotatable (e.g., manually rotatable) about the first rotational axis 144 (FIG. 1) along a range of motion, as indicated by arrow R1 (FIG. 6). This rotation allows the propagation direction 168 of the light from the first set of light emitting elements 156 to be adjusted along a height of the wall 204 between an uppermost position and a lowermost position. In some embodiments, the uppermost position is on the wall 204 adjacent the ceiling 200 and the lowermost position is on the wall 204 adjacent the floor 212. Similarly, the third housing portion 140 is rotatable (e.g., manually rotatable) about the second rotational axis 148 (FIG. 1) along a range of motion, as indicated by arrow R2 (FIG. 6). This rotation allows the propagation direction 172 of light from the second set of light emitting elements 160 to be adjusted along a height of the wall 208 between similar uppermost and lowermost positions. By adjusting the rotation of the housings 136, 140, the light emitted from the light emitting elements 156, 160 creates an image at the desired height along the respective wall 204, 208. Adjustment may be desirable to accommodate for different ceiling heights (to which the display unit 100 is mounted) and/or different sightlines for occupants of different ages. For example, a school setting may benefit from an image projected on a wall surface at a lower height than in a business setting due to the lower average height of the occupants. In the illustrated embodiment, the propagation direction 176 of the light from the third set of light emitting elements 164 (for emitting light on the floor 212) is non-rotatable and stationary, as the third set of light emitting elements 164 is not movable relative to the first housing portion 112 coupled to the ceiling 200. In other embodiments, the protrusion 132 may be movable relative to the remainder of the first housing portion 112 to accommodate a non-central mounting of the display unit 100 between the two walls 204, 208 or to otherwise direct the light away from a location directly below the display unit 100.

As shown in FIG. 4, the interior of the first housing portion 112 accommodates a processing system 180 that operates the first, second, and third sets of light emitting elements 156, 160, 164. In the embodiment shown, the processing system 180 includes a circuit board 192 electrically coupled to each of the individual light emitting elements of three sets 156, 160, 164. The processing system 180 is programmed to communicate (e.g., via a wired connection, wirelessly) with a sensor 152, receiving a signal from the sensor 152, and control at least one of the plurality of light emitting elements 156, 160, 164 in response to the signal. The sensor is configured to generate the signal in response to an input. In some embodiments, the input may be detection of a gunshot, detection of a fire, or detection of smoke. In some embodiments, the input may be a manual input by an occupant, such as an emergency button, a fire alarm, or the like. In some embodiments, the sensor 152 is located within the housing 104 (e.g., within the first housing portion 112). In other embodiments, the sensor 152 may be located within a remote device separate and distinct from the housing 104, communicating wirelessly or via wires (such as cables 184) with the processing system 180. The wires 184 are electrically coupled to the processing system 180 and provide power and/or data communication between the processing system 180 and external devices 196. External devices 196 may include a power source (e.g., an AC power source, a DC power source), a server for storing data, an input device, and/or a monitoring device. As shown in FIG. 3, a cover 186 is positioned over a hatch and is removable to provide access to the processing system 180 and/or the cables 184 where they couple to the processing system. The cover 186 is located on the upper side 124 of the housing 104 adjacent the ceiling 200 and is therefore generally inaccessible when the display unit 100 is mounted to the ceiling 200.

As shown in FIGS. 1, 3, and 4, the display unit 100 additionally includes a light panel 188 (e.g., RGB display) coupled to each of the forward and rearward sides (i.e., those extending between the left and right sides that support the second and third housing portions 136, 140) of the housing 104. In the embodiment shown, the light panel 188 is a 4×4 RGB display. The light panels 188 may be illuminated to display a status of the display unit (e.g., operational, non-operational) or may display an image similar to the one displayed by an activated light emitting element. For example, if the first light emitting element 156A, 160A, 164 of each of the three sets of light emitting elements 156, 160, 164 is activated to shine an "X" on the floor 212 and walls 204, 208, the light panels 188 may additionally display an "X" to indicate to a user that they should stop and/or turn around. If the light emitting elements 156, 160, 164 are illuminated to point arrows away from an occupant in the hallway, the light panel 188 may generate a forward arrow. If the light emitting elements 156, 160, 164 are illuminated to point arrows towards the occupant in the hallway, the light panel 188 may generate an indicator to turn around. The light panel 188 provides an additional visible indicator, especially if an occupant is walking down a hall and is yet far away from the display unit.

In some embodiments, an additional layer of transparent glass is provided within the housing portions 112, 136, 140 to cover the sets of light emitting elements 164, 156, 160, respectively. The glass provides an additional layer of protection for the light emitting elements 156, 160, 164 from the environment and occupants.

A number of implementations have been described. Nevertheless, it will be understood that various modifications may be made without departing from the spirit and scope of the disclosure. Accordingly, other implementations are within the scope of the following claims.

The invention claimed is:

1. A display unit for an event indicator system configured to assist occupants of a venue in response to an evacuation situation sensed by a sensor configured to generate a signal in response to detection of the evacuation situation, the display unit comprising:

a housing configured to be mountable to a ceiling of the venue via a bracket, the housing including a first housing portion coupled to the bracket and a second housing portion coupled to and rotatable relative to the first housing portion;

a plurality of light emitting elements affixed within the second housing portion such that the plurality of light emitting elements are rotatable with the second housing portion relative to the first housing portion such that a propagation direction of light from the plurality of light emitting elements is adjustable relative to the ceiling; and a processing system positioned within the housing and configured to communicate with the sensor to receive the signal from the sensor and control at least one of the plurality of light emitting elements in response to the signal.

2. The display unit of claim 1, wherein the propagation direction of light from the plurality of light emitting elements is directed to a wall extending downward from the ceiling.

3. The display unit of claim 1, wherein the second housing portion is substantially cylindrical defining a central axis, wherein the central axis is a rotational axis of the second housing portion relative to the first housing portion.

4. The display unit of claim 1, wherein the plurality of light emitting elements is a first plurality of light emitting elements, the display unit further comprising:

a third housing portion coupled to and rotatable relative to the first housing portion, and a second plurality of light emitting elements affixed within the third housing portion such that the second plurality of light emitting elements are rotatable with the third housing portion relative to the first housing portion.

5. The display unit of claim 4, wherein the third housing portion is separate and distinct from the second housing portion such that the third housing portion is rotatable without rotation of the second housing portion and the second housing portion is rotatable without rotation of the third housing portion.

6. The display unit of claim 4, wherein the propagation direction of light from the first plurality of light emitting elements is directed to a first wall extending downward from the ceiling, and wherein a propagation direction of light from the second plurality of light emitting elements is directed to a second wall extending downward from the ceiling, the second wall opposite the first wall.

7. The display unit of claim 4, further comprising a third plurality of light emitting elements affixed within the first housing portion such that a propagation direction of light from the third plurality of light emitting elements is towards a floor surface.

8. The display unit of claim 4, wherein the second housing portion is rotatable relative to the first housing portion about a first rotational axis, and wherein the third housing portion is rotatable relative to the first housing portion about a second rotational axis, wherein the first rotational axis is parallel to the second rotational axis.

9. The display unit of claim 1, wherein the first housing portion includes an upper housing coupled to the bracket and a lower housing coupled to the upper housing, wherein the second housing portion is at least partially encapsulated between the upper housing and the lower housing.

10. The display unit of claim 1, wherein the sensor is positioned within the housing.

11. The display unit of claim 1, wherein the plurality of light emitting elements includes a first light emitting element configured to project an arrow and a second light emitting element configured to project an X.

12. The display unit of claim 1, wherein the processing system is positioned within the first housing portion.

13. The display unit of claim 1, wherein the second housing portion is rotatable relative to the first housing portion between an uppermost position and a lowermost position and is holdable at a plurality of positions between the uppermost position and the lowermost position.

14. The display unit of claim 1, wherein the first housing portion includes an upper side coupled to the bracket and an underside opposite the upper side, wherein a protrusion extends outward away from an interior of the housing to support a plurality of stationary light emitting elements therein, wherein the plurality of stationary light emitting elements are configured to project light on a floor surface.

15. A display unit for an event indicator system configured to assist occupants of a venue in response to an evacuation situation detected by a sensor configured to generate a signal in response to an input, the display unit comprising:

a housing configured to be mountable to a ceiling of the venue via a bracket, the housing including a first housing portion coupled to the bracket a second housing portion coupled to and rotatable relative to the first housing portion, and a third housing portion coupled to and rotatable relative to the first housing portion, the second and third housing portions separate and distinct from one another;

a first plurality of light emitting elements affixed within the second housing portion such that the first plurality of light emitting elements are rotatable with the second housing portion relative to the first housing portion such that a propagation direction of light from the first plurality of light emitting elements is adjustable relative to the ceiling;

a second plurality of light emitting elements affixed within the third housing portion such that the second plurality of light emitting elements are rotatable with the third housing portion relative to the first housing portion such that a propagation direction of light from the second plurality of light emitting elements is adjustable relative to the ceiling; and a processing system positioned within the housing and in communication with the sensor and configured to receive the signal from the sensor and control at least one of the first plurality of light emitting elements and at least one of the second plurality of light emitting elements in response to the signal.

16. The display unit of claim 15, wherein the at least one of the first plurality of light emitting elements and the at least one of the second plurality of light emitting elements is configured to direct occupants in a desired direction within the evacuation situation.

17. The display unit of claim 16, further comprising a third plurality of light emitting elements coupled to the first housing portion and non-rotatable relative to the first housing portion, wherein the third plurality of light emitting elements is configured to direct occupants in a desired direction within the evacuation situation.

18. The display unit of claim 17, wherein the first plurality of light emitting elements is configured to project light on a first wall extending from the ceiling, the second plurality of light emitting elements is configured to project light on a second wall extending from the ceiling, and the third plurality of light emitting elements is configured to project light on a floor surface.

19. The display unit of claim 15, wherein the second housing portion is substantially cylindrical, defining a central axis, wherein the central axis of the second housing portion is a rotational axis of the second housing portion relative to the first housing portion, wherein the third housing portion is substantially cylindrical, defining a central axis, wherein the central axis of the third housing portion is a rotational axis of the third housing portion relative to the first housing portion, and wherein the central axis of the second housing portion is parallel to the central axis of the third housing portion.

20. A display unit for an event indicator system configured to assist occupants of a venue in response to an evacuation situation, the display unit comprising:

a housing configured to be mountable to a ceiling of the venue via a bracket, the housing including a first housing portion coupled to the bracket a second housing portion coupled to and rotatable relative to the first housing portion, and a third housing portion coupled to and rotatable relative to the first housing portion, the second and third housing portions separate and distinct from one another;

a first plurality of light emitting elements affixed within the second housing portion such that the first plurality of light emitting elements are rotatable with the second housing portion relative to the first housing portion such that a propagation direction of light from the first plurality of light emitting elements is adjustable relative to the ceiling;

a second plurality of light emitting elements affixed within the third housing portion such that the second plurality of light emitting elements are rotatable with the third housing portion relative to the first housing portion such that a propagation direction of light from the second plurality of light emitting elements is adjustable relative to the ceiling; and a processing system positioned within the housing and configured to control at least one of the first plurality of light emitting elements and at least one of the second plurality of light emitting elements, wherein the at least one of the first plurality of light emitting elements and the at least one of the second plurality of light emitting elements is configured to generate a symbol on a respective wall to direct occupants in a desired direction within the evacuation situation.

* * * * *